US007814109B2

(12) United States Patent
Brower et al.

(10) Patent No.: US 7,814,109 B2
(45) Date of Patent: Oct. 12, 2010

(54) AUTOMATIC CATEGORIZATION OF NETWORK EVENTS

(75) Inventors: Chad Brower, Campbell, CA (US);
Shyam Kapur, Sunnyvale, CA (US);
Brian Coppola, Altadena, CA (US);
Joshua M. Koran, Mountain View, CA (US); Jignashu Parikh, Jamnagar (IN)

(73) Assignee: Yahoo! Inc., Sunnyvale, CA (US)

( * ) Notice: Subject to any disclaimer, the term of this patent is extended or adjusted under 35 U.S.C. 154(b) by 68 days.

(21) Appl. No.: 11/394,342

(22) Filed: Mar. 29, 2006

(65) Prior Publication Data
US 2007/0233650 A1 Oct. 4, 2007

(51) Int. Cl.
*G06F 17/30* (2006.01)
(52) U.S. Cl. .................. 707/751; 707/768
(58) Field of Classification Search .......... None
See application file for complete search history.

(56) References Cited

U.S. PATENT DOCUMENTS

| 6,453,315 | B1 * | 9/2002 | Weissman et al. ............. 707/5 |
| 6,839,680 | B1 | 1/2005 | Liu |
| 6,934,748 | B1 | 8/2005 | Louviere et al. |
| 6,973,418 | B1 | 12/2005 | Kirshenbaum |
| 7,249,121 | B1 * | 7/2007 | Bharat et al. .................. 707/3 |
| 2002/0107844 | A1 * | 8/2002 | Cha et al. ..................... 707/3 |
| 2002/0194055 | A1 | 12/2002 | Takakura et al. |
| 2003/0037050 | A1 * | 2/2003 | Monteverde .................. 707/6 |
| 2003/0046265 | A1 | 3/2003 | Orton et al. |
| 2003/0154282 | A1 | 8/2003 | Horvitz |
| 2003/0177054 | A1 | 9/2003 | Reinbold et al. |
| 2003/0220913 | A1 * | 11/2003 | Doganata et al. ............. 707/3 |
| 2003/0229629 | A1 | 12/2003 | Jasinschi et al. |

(Continued)

FOREIGN PATENT DOCUMENTS

WO WO 03/025696 A2 3/2003

(Continued)

OTHER PUBLICATIONS

U.S. Appl. No. 11/394,343, filed Mar. 29, 2006, Koran et al.

(Continued)

*Primary Examiner*—Neveen Abel Jalil
*Assistant Examiner*—Son T Hoang
(74) *Attorney, Agent, or Firm*—Stattler-Suh PC

(57) ABSTRACT

A system and method to facilitate automatic categorization of events in a network, wherein one or more keywords are retrieved from a keyword database, each retrieved keyword matching a corresponding event unit of an event input by a user over a network. A dominant keyword corresponding to a highest parameter value calculated for each retrieved keyword is then selected. Finally, the event is categorized based on one or more categories associated with the dominant keyword. The dominant keyword may be selected based on one or more keyword categories associated with each retrieved keyword and an ambiguity parameter value calculated for each keyword. Alternatively, the dominant keyword may be selected based on a highest-ranked output value calculated for each retrieved keyword. One or more categories associated with the dominant keyword are subsequently retrieved from the keyword database and the event is categorized based on the category associated with the dominant keyword.

22 Claims, 7 Drawing Sheets

U.S. PATENT DOCUMENTS

| | | |
|---|---|---|
| 2004/0103017 A1 | 5/2004 | Reed et al. |
| 2004/0107125 A1 | 6/2004 | Guheen et al. |
| 2004/0141003 A1 | 7/2004 | Nivers et al. |
| 2005/0033771 A1 | 2/2005 | Schmitter et al. |
| 2005/0234763 A1 | 10/2005 | Pinto et al. |
| 2006/0080292 A1* | 4/2006 | Alanzi ............................ 707/3 |
| 2006/0155693 A1* | 7/2006 | Chowdhury et al. ........... 707/4 |
| 2006/0155764 A1 | 7/2006 | Tao |
| 2006/0190439 A1* | 8/2006 | Chowdhury et al. ........... 707/3 |
| 2006/0218141 A1 | 9/2006 | Tuttle et al. |
| 2006/0282312 A1* | 12/2006 | Carlson et al. ................. 705/14 |
| 2007/0011039 A1 | 1/2007 | Oddo |
| 2007/0100796 A1 | 5/2007 | Wang |

FOREIGN PATENT DOCUMENTS

| | | |
|---|---|---|
| WO | WO 2005/006283 A2 | 1/2005 |
| WO | WO 2005/010702 A2 | 2/2005 |
| WO | WO 2005/119521 A2 | 12/2005 |

OTHER PUBLICATIONS

U.S. Appl. No. 11/394,374, filed Mar. 29, 2006, Brower et al.
U.S. Appl. No. 11/394,353, filed Mar. 29, 2006, Brower et al.
U.S. Appl. No. 11/394,332, filed Mar. 29, 2006, Koran et al.
U.S. Appl. No. 11/394,358, filed Mar. 29, 2006, Chung et al.

* cited by examiner

AUTOMATIC CATEGORIZATION OF NETWORK EVENTS

TECHNICAL FIELD

The present invention relates generally to the field of network-based communications and, more particularly, to a system and method to facilitate automatic categorization of events in a network, such as the Internet.

BACKGROUND OF THE INVENTION

The explosive growth of the Internet as a publication and interactive communication platform has created an electronic environment that is changing the way business is transacted. As the Internet becomes increasingly accessible around the world, users need efficient tools to navigate the Internet and to find content available on various websites.

Internet portals provide users an entrance and guide into the vast resources of the Internet. Typically, an Internet portal provides a range of search, email, news, shopping, chat, maps, finance, entertainment, and other content and services. Thus, the information presented to the users needs to be efficiently and properly categorized and stored within the portal.

SUMMARY OF THE INVENTION

A system and method to facilitate automatic categorization of events in a network are described. One or more keywords are retrieved from a keyword database, each retrieved keyword matching a corresponding event unit of an event input by a user over a network. A dominant keyword corresponding to a highest parameter value calculated for each retrieved keyword is then selected. Finally, the event is categorized based on one or more categories associated with the dominant keyword. The dominant keyword may be selected based on one or more keyword categories associated with each retrieved keyword and an ambiguity parameter value calculated for each keyword. Alternatively, the dominant keyword may be selected based on a highest-ranked output value calculated for each retrieved keyword. One or more categories associated with the dominant keyword are subsequently retrieved from the keyword database and the event is categorized based on the category associated with the dominant keyword.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A system and method to facilitate automatic categorization of events in a network are described. One or more keywords are retrieved from a keyword database, each retrieved keyword matching a corresponding event unit of an event input by a user over a network. A dominant keyword corresponding to a highest parameter value calculated for each retrieved keyword is then selected. Finally, the event is categorized based on one or more categories associated with the dominant keyword. The dominant keyword may be selected based on one or more keyword categories associated with each retrieved keyword and an ambiguity parameter value calculated for each keyword. Alternatively, the dominant keyword may be selected based on a highest-ranked output value calculated for each retrieved keyword. One or more categories associated with the dominant keyword are subsequently retrieved from the keyword database and the event is categorized based on the category associated with the dominant keyword.

Figure 1:
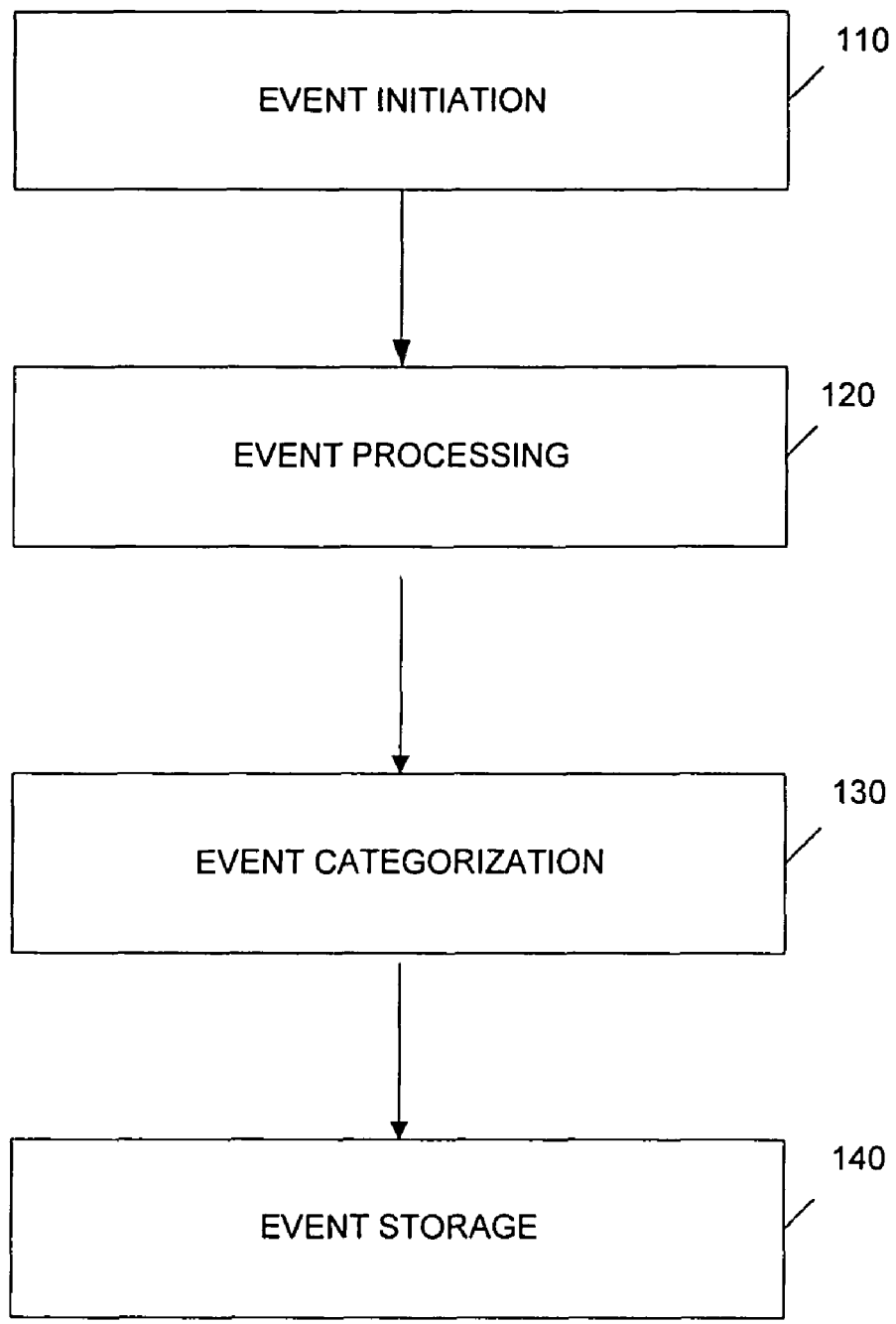
FIG. 1 is a flow diagram illustrating an event processing sequence, according to one embodiment of the invention.

FIG. 1 is a flow diagram illustrating an event processing sequence, according to one embodiment of the invention. As shown in FIG. 1, the sequence 100 starts with event initiation at processing block 110. In one embodiment, users access an entity over a network, such as, for example, the Internet, and input various data, which is subsequently captured by selective processing modules within the network-based entity. The user input typically comprises one or more "events."

In one embodiment, an event is a type of action initiated by the user, typically through a conventional mouse click command. Events include, for example, advertisement clicks, search queries, search clicks, sponsored listing clicks, page views and advertisement views. However, events, as used herein, may include any type of online navigational interaction or search-related events.

Generally, a page view event occurs when the user views a web page. In one example, a user may enter a web page for music within an Internet portal by clicking on a link for the music category page. Thus, a page view event is recorded for the user's view of the music category page.

An advertisement view event occurs when the user views a web page for an advertisement. For example, an Internet portal may display banner advertisements on the home page of the portal. If the user clicks on the banner advertisement, the portal redirects the user to the link for the corresponding advertiser. The display of a web page, in response to the conventional mouse click command, constitutes an advertisement click event. A user may then generate multiple page view events by visiting multiple web pages at the advertiser's web site.

An advertisement click event occurs when a user clicks on an advertisement. For example, a web page may display a banner advertisement. An advertisement click event occurs when the user clicks on the banner advertisement.

A search query event occurs when a user submits one or more search terms within a search query to a web-based search engine. For example, a user may submit the query "Deep Sea Fishing", and a corresponding search query event containing the search terms "Deep Sea Fishing" is recorded. In response to a user query, a web-based search engine returns a plurality of links to web pages relevant to the corresponding search query terms. If a user clicks on one of the links, a search click event occurs.

A sponsored listing advertisement refers to advertisements that are displayed in response to a user's search criteria. A sponsored listing click event occurs when a user clicks on a sponsored listing advertisement displayed for the user.

Next, referring back to FIG. 1, event processing is performed at processing block 120. In one embodiment, the event is parsed to obtain one or more event units and the event units are subsequently used to characterize the event, as described in further detail below. The sequence 100 continues at processing block 130 with categorization of the received events. In one embodiment, each processed event is categorized based on the parsed event units and further based on data stored within the entity, as described in further detail below. Finally, at processing block 140, the sequence ends with storage of the categorized events. In one embodiment, each categorized event is further stored within one or more associated databases, containing, for example, hierarchical taxonomies, as described in further detail below.

Figure 2:
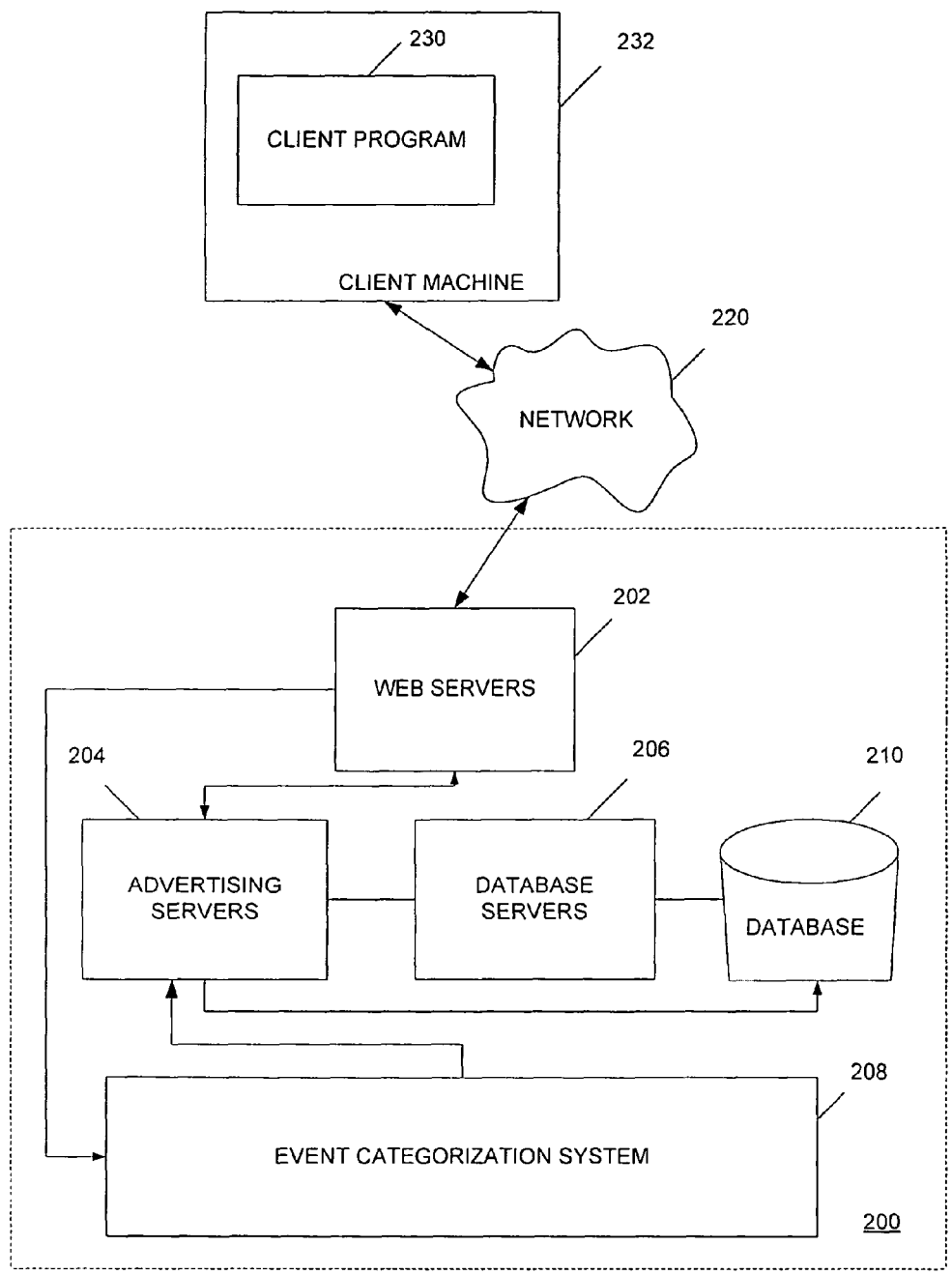
FIG. 2 is a block diagram illustrating an exemplary network-based entity containing a system to facilitate automatic categorization of events, according to one embodiment of the invention.

FIG. 2 is a block diagram illustrating an exemplary network-based entity, which facilitates automatic categorization of events. While an exemplary embodiment of the present invention is described within the context of an entity 200 enabling automatic categorization of events, it will be appreciated by those skilled in the art that the invention will find application in many different types of computer-based, and network-based, entities, such as, for example, commerce entities, content provider entities, or other known entities having a presence on the network.

In one embodiment, the entity 200, such as, for example, an Internet portal, includes one or more front-end web processing servers 202, which may, for example, deliver web pages to multiple users, (e.g., markup language documents), handle search requests to the entity 200, provide automated communications to/from users of the entity 200, deliver images to be displayed within the web pages, deliver content information to the users, and other processing servers, which provide an intelligent interface to the back-end of the entity 200.

The entity 200 further includes one or more back-end servers, for example, one or more advertising servers 204, and one or more database servers 206, each of which maintaining and facilitating access to one or more respective databases 210. In one embodiment, the advertising servers 204 are coupled to a respective database 210 and are configured to select and transmit content, such as, for example, advertisements, sponsored links, integrated links, and other types of advertising content, to users via the network 220. In one embodiment, the entity 200 further includes a system 208 to facilitate automatic categorization of events within the network-based entity 200, as described in further detail below, the system 208 being coupled to the web servers 202 and the advertising servers 204.

The network-based entity 200 may be accessed by a client program 230, such as a browser (e.g., the Internet Explorer browser distributed by Microsoft Corporation of Redmond, Wash.) that executes on a client machine 232 and accesses the facility 200 via a network 220, such as, for example, the Internet. Other examples of networks that a client may utilize to access the facility 100 includes a wide area network (WAN), a local area network (LAN), a wireless network (e.g., a cellular network), the Plain Old Telephone Service (POTS) network, or other known networks.

Figure 3:
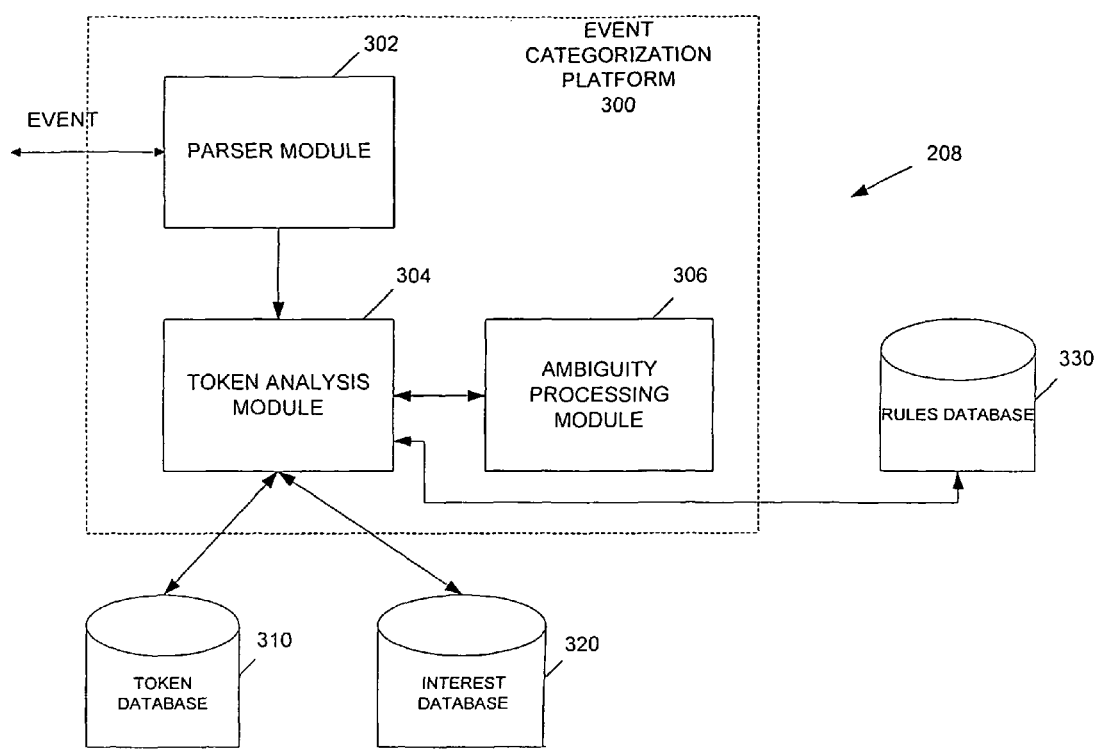
FIG. 3 is a block diagram illustrating the system to facilitate automatic categorization of events within the network-based entity, according to one embodiment of the invention.

FIG. 3 is a block diagram illustrating a system 208 to facilitate automatic categorization of events within the network-based entity, according to one embodiment of the invention. As illustrated in FIG. 2, the system 208 includes an event categorization platform 300 coupled to multiple databases, such as, for example, a token database 310, an interest database 320 and a rules database 330.

In one embodiment, the token database 310 stores a list of single-word or multi-word keywords, also known as tokens, collected automatically or, in the alternative, manually, from various servers within the entity 200, from editors associated with the entity 200, and/or from other third-party entities connected to the entity 200 via the network 220. The tokens are further organized into a hierarchical taxonomy within the database 310 based on associations with their respective events of origin. In one embodiment, the hierarchical token taxonomy stored in the token database 310 is manually mapped into a hierarchical taxonomy of categorized tokens, which is further stored within the interest database 320. The hierarchical taxonomy is reviewed, edited, and updated automatically by the event categorization platform 300, or, in the alternative, manually by editors and/or other third-party entities.

The mapping assigns one or more categories to each stored token, the assigned categories being subsequently stored within the interest database 320 at respective nodes associated with each corresponding token. For example, the taxonomy may comprise a high-level category for "music," and several sub-categories, located hierarchically below the "music" category, and illustrating different genres of music. However, it is to be understood that any other representation of a taxonomy used to classify subject matter may be used in conjunction with the event categorization platform 300 within the system 208 without deviating from the spirit or scope of the invention. In addition, in an alternate embodiment, the assigned categories may not be mapped into a hierarchical taxonomy and may instead be stored as a collection of categories within the interest database 320.

In one embodiment, the event categorization platform 300 receives various events from the front-end web servers 202, such as, for example, search queries transmitted by users via the network 220, web page views, advertising page views, search results clicks, advertisement clicks, and other types of interactive events, and enables automatic categorization of the received events based on data stored in the associated databases 310, 320, and 330, as described in further detail below.

In one embodiment, the event categorization platform 300 further includes a parser module 302 configured to receive an event, such as, for example, a search query, and to parse the event to generate multiple event units, such as, for example, query terms. The event categorization platform 300 further includes a keyword or token analysis module 304 coupled to the parser module 302 and configured to receive the event units from the parser module 302 and to categorize the event based on the event units and on data stored in the associated databases 310 and 320, as described in further detail below. Finally, the event categorization platform 300 includes an ambiguity processing module 306 coupled to the token analysis module 304 and configured to generate an ambiguity value corresponding to each categorized event, as described in further detail below.

Figure 4:
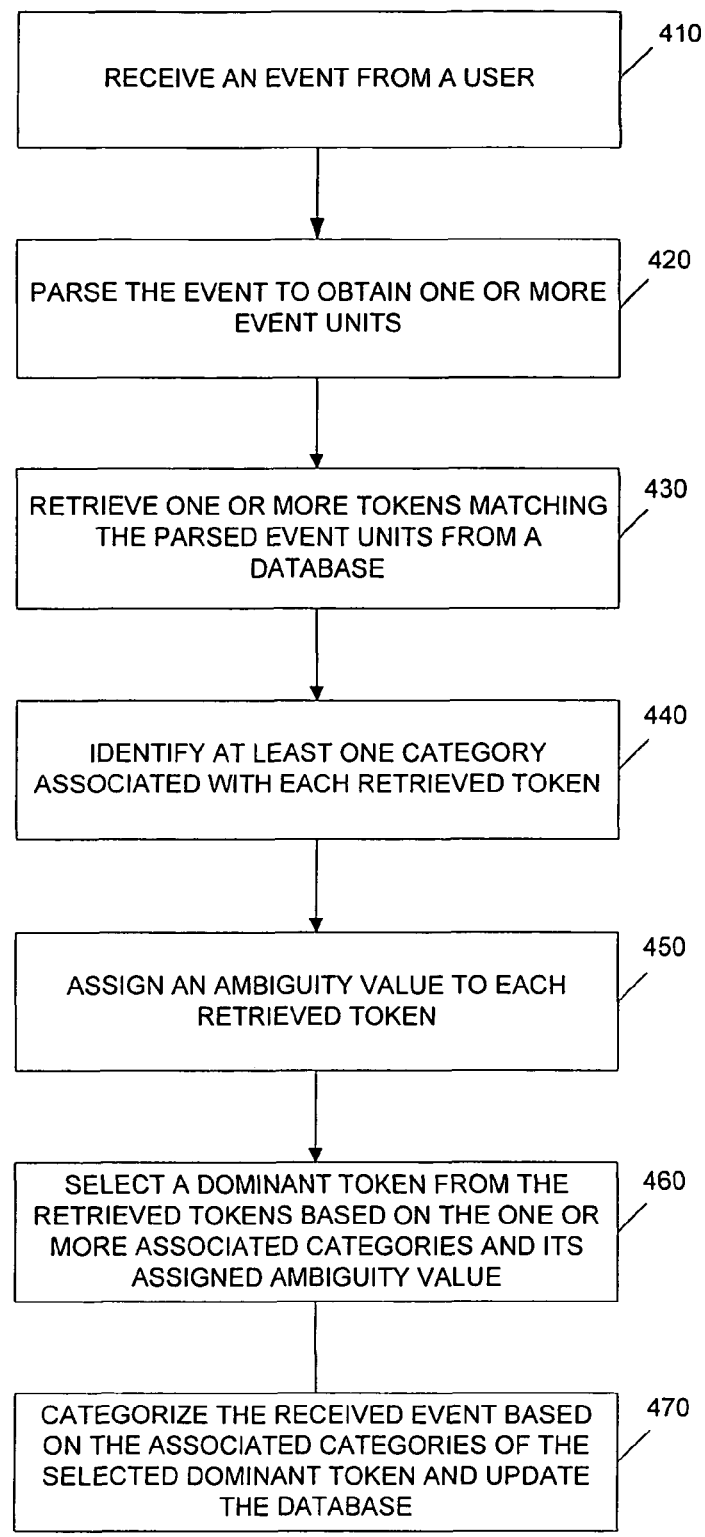
FIG. 4 is a flow diagram illustrating a method to facilitate automatic categorization of events in a network, according to one embodiment of the invention.

FIG. 4 is a flow diagram illustrating a method to facilitate automatic categorization of events in a network, according to one embodiment of the invention. As illustrated in FIG. 4, at processing block 410, an event, such as, for example, a search query is received from a user. In one embodiment, the user accesses a web page displayed in the client program 230 of the client machine 232 and transmits a search query to the entity 200 via the client machine 232 and the network 220. The front-end web servers 202 receive the search query and forward the query to the event categorization platform 300.

At processing block 420, the event is parsed to generate one or more event units. In one embodiment, the parser module 302 parses the event, such as, for example, the search query, to obtain one or more units (e.g., query terms), and further transmits the event units to the token analysis module 304. If, for example, the user inputs the "Deep Sea Fishing" search query, the parser module 302 parses the query to obtain query terms, such as, for example, "deep," "sea," "fishing," and/or combination query terms, such as, for example, "deep sea," and further transmits the resulting query terms to the token analysis module 304.

At processing block 430, tokens matching the parsed event units are retrieved from the database. In one embodiment, the token analysis module 304 accesses the keyword interest database 320 and retrieves one or more categorized tokens that match the parsed event units. Alternatively, the token analysis module 304 may access the general token database 310 to retrieve one or more matching tokens.

In one embodiment, the token analysis module 304 compares each event unit to tokens stored in the database 320, or, alternatively, in the database 310, and selects the longest possible tokens, i.e., tokens having the greatest number of words or the greatest length. Alternatively, the token analysis module 304 selects the tokens that have the highest probability to appear within the registered events. The selection is based on a unit frequency parameter associated with each token, which specifies how many times each particular token is contained within the events.

In our case, if the token analysis module 304 receives the "deep," "sea," "fishing," and "deep sea" terms from the parser module 302, it accesses the interest database 320 and retrieves one or more categorized keywords having the greatest length or having the highest probability to appear within the event, such as, for example, "deep sea" and "fishing."

At processing block 440, one or more categories associated with the retrieved tokens are identified. In one embodiment, the token analysis module 304 analyzes the retrieved categorized tokens and identifies one or more keyword categories associated with the retrieved tokens. Alternatively, if the tokens are retrieved from the general token database 310, the token analysis module 304 may assign one or more keyword categories to each retrieved token, either editorially or algorithmically, the assigned categories forming a corresponding hierarchical taxonomy, or, in the alternative, may discard the tokens without an associated category.

For example, the token analysis module 304 may retrieve a "marine" category and a "water sports" category corresponding to the "deep sea" token. Similarly, the token analysis module 304 may retrieve a "commercial" category and a "water sports" category corresponding to the "fishing" token.

At processing block 450, an ambiguity parameter value is assigned to each retrieved token. In one embodiment, the ambiguity processing module 306 receives the tokens from the token analysis module 304 and calculates a corresponding ambiguity value for each token, for example, as a factor of the conditional probability of the token category being the overall event category given the presence of the particular token within the analyzed event.

For example, the ambiguity processing module 306 may calculate an ambiguity parameter value $a_1=50\%$ as the conditional probability that "marine" is the overall event category and an ambiguity parameter value $a_2=50\%$ as the conditional probability that "water sports" is the dominant event category. Similarly, the ambiguity processing module 306 may calculate an ambiguity parameter value $a_3=40\%$ as the conditional probability that "commercial" is the overall event category and an ambiguity parameter value $a_4=60\%$ as the conditional probability that "water sports" is the dominant event category.

At processing block 460, a dominant token is selected from the retrieved tokens based on the one or more associated token categories, each token's assigned ambiguity parameter value, and a set of event processing rules stored within the rules database 330. In one embodiment, the token analysis module 304 applies predetermined processing rules stored in the rules database 330 to select the dominant token, such as, for example, rules specifying elimination of tokens that contain one or more stop words, rules specifying the minimum frequency of token appearance within stored events, and other rules designed to rank the retrieved tokens. For example, subsequent to the elimination of any tokens that may contain stop words, the token analysis module 304 applies the above processing rules and selects "fishing" and its associated category having the highest ambiguity parameter value (e.g., "water sports").

In one embodiment, in addition to the ambiguity parameter value, the token analysis module 304 assigns a confidence score, which represents an assessment of the accuracy of the dominant token selection and of the overall event categorization, and stores the confidence score with the corresponding overall event. In the above example, the token analysis module 304 may assign or calculate a confidence score of 80 percent, which represents the accuracy prediction that the selection of "fishing" as the dominant token and "water sports" as its associated category is the correct overall categorization decision.

Finally, at processing block 470, the overall event is categorized based on the one or more token categories associated with the dominant token and the respective databases 310, 320 are updated to include the newly categorized event. In one embodiment, the event embodied in the search query "Deep Sea Fishing" input by the user is categorized under the "water sports" category and is stored accordingly in the respective databases 310 and 320 with its associated confidence score.

In an alternate embodiment, the token analysis module 304 may discard the overall event if the assigned confidence score is lower than a predetermined threshold score, thus indicating a low confidence that the categorization procedure described in detail above is accurate.

In another alternate embodiment, even if the assigned confidence score is lower than the predetermined threshold score, the token analysis module 304 may still store the confidence score along with the corresponding overall event. In this embodiment, other external modules and/or systems, such as, for example, a behavioral targeting system, which is configured to identify interests of users based on the users' online activities, or any of its components, may retrieve and discard the stored event if its associated confidence score is lower than the predetermined threshold score.

In yet another alternate embodiment, the event may be fractionally divided among the multiple categories corresponding to the retrieved tokens according to the ambiguity parameter value associated with each token. Subsequently, the event may be categorized within each token category according to an assigned weight equal to the corresponding ambiguity parameter value. In the example described above, the event embodied in the search query "Deep Sea Fishing" input by the user may be fractionally divided among the "water sports" category, the "marine" category, and the "commercial" category, and may be further categorized within each of the above categories with respective assigned weights equal to each corresponding ambiguity parameter value.

Figure 5:
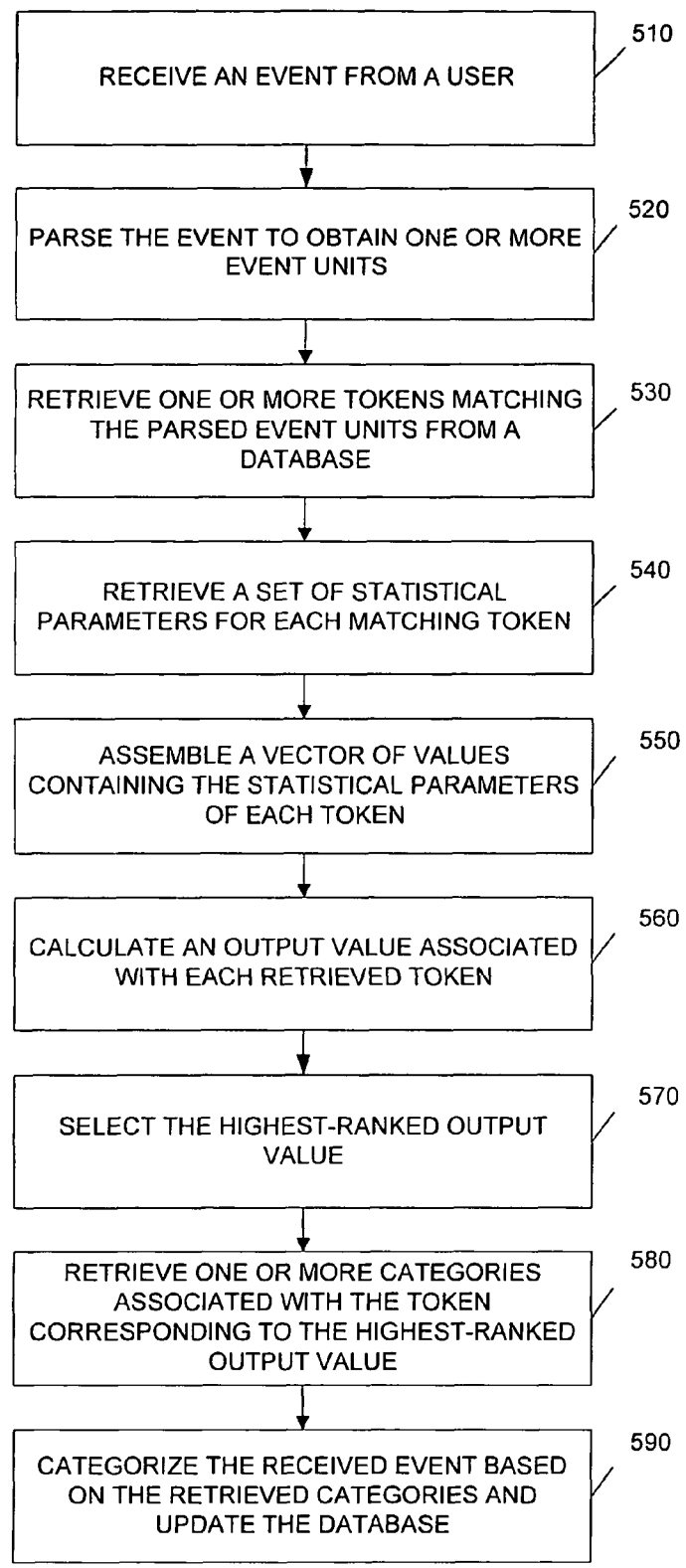
FIG. 5 is a flow diagram illustrating a method to facilitate automatic categorization of events in a network, according to an alternate embodiment of the invention.

FIG. 5 is a flow diagram illustrating a method to facilitate automatic categorization of events in a network, according to an alternate embodiment of the invention. As illustrated in FIG. 5, at processing block 510, an event, such as, for example, a search query is received from a user. In one embodiment, the user accesses a web page displayed in the client program 230 of the client machine 232 and transmits a search query to the entity 200 via the client machine 232 and the network 220. The front-end web servers 202 receive the search query and forward the query to the event categorization platform 300.

At processing block 520, the event is parsed to generate one or more event units. In one embodiment, the parser module 302 parses the event, such as, for example, the search query, to obtain one or more units (e.g., query terms), and further transmits the event units to the token analysis module 304.

At processing block 530, tokens matching the parsed event units are retrieved from the database. In one embodiment, the token analysis module 304 accesses the interest database 320 and retrieves one or more categorized tokens that match the parsed event units. Alternatively, the token analysis module 304 may access the general token database 310 to retrieve one or more matching tokens.

Subsequent to the retrieval of one or more matching tokens, at processing block 540, a set of statistical parameters corresponding to each retrieved matching token is retrieved from the database. In one embodiment, the token analysis module 304 accesses the interest database 320 and retrieves one or more statistical parameters corresponding to each of the matching tokens. The statistical parameters for each token may include, for example, a frequency of token presence in event logs, a frequency of token presence inside a particular event, such as, for example, a search query, an ambiguity value of the token, a probability that the token dominates the overall event, a probability that the token dominates another token, a probability that a category associated with the token dominates the overall event, a probability that the category dominates a category associated with another token, and or other known statistical parameters that enable determination of the dominant token within the event.

At processing block 550, a vector of values containing the retrieved statistical parameters is assembled. In one embodiment, the token analysis module 304 assembles the statistical parameters associated with each token into a vector of values.

At processing block 560, an output value associated with each token is calculated. In one embodiment, the token analysis module 304 inputs the vector of values into a known machine-learning unit (not shown), such as, for example, a known neural network structure. Alternatively, the vector of values may be input into a known support vector machine (not shown), into a known non-linear regression mechanism (not shown), or into any known machine-learning unit that accepts a vector input. In one embodiment, the event categorization platform 300 further includes the machine-learning unit coupled to the token analysis module 304. Alternatively, the machine-learning unit may reside externally and may be coupled to the token analysis module 304.

In one embodiment, the machine-learning unit, such as, for example, the neural network structure, or, in the alternative, the support vector machine or the non-linear regression mechanism, is configured to receive the vector input and to determine the output value associated with each token, the output value indicating the probability that the corresponding token is the dominant token of the event.

Subsequently, at processing block 570, the highest output value is selected. In one embodiment, the machine-learning unit orders the calculated output values, selects the highest ranked output value, and transmits the selected output value to the token analysis module 304. In one embodiment, in addition to determining each output value as the probability that the corresponding token is the dominant token of the event, the machine-learning unit further calculates a confidence score, which represents an assessment of the accuracy of the dominant token determination and of the overall event categorization. The confidence score is then transmitted to the token analysis module 304. In an alternate embodiment, the token analysis module 304 may calculate the confidence score using information received from the machine-learning unit.

At processing block 580, one or more categories associated with a token corresponding to the highest output value are retrieved from the database. In one embodiment, the token analysis module 304 identifies a token corresponding to the selected highest output value and retrieves one or more categories associated with the retrieved token.

Finally, at processing block 590, the overall event is categorized based on the one or more token categories associated with the identified token having the highest output value and the respective databases 310, 320 are updated to include the newly categorized event, which is stored along with its associated confidence score.

In an alternate embodiment, the token analysis module 304 may discard the overall event if the assigned confidence score is lower than a predetermined threshold score, thus indicating a low confidence that the categorization procedure described in detail above is accurate.

In another alternate embodiment, even if the assigned confidence score is lower than the predetermined threshold score, the token analysis module 304 may still store the confidence score along with the corresponding overall event. In this embodiment, other external modules and/or systems, such as, for example, a behavioral targeting system, or any of its components, may retrieve and discard the stored event if its associated confidence score is lower than the predetermined threshold score.

In yet another alternate embodiment, the vector of values includes data related to a pair of tokens. The machine-learning unit receives the input vector and selects the dominant token, as described in detail above. Subsequently, the machine-learning unit receives data related to an additional token, compares the additional token to the selected dominant token and further selects a new dominant token. The procedure continues iteratively with the remaining tokens until all data is exhausted and a final dominant token is selected.

In one embodiment, the event categorization system 208 and the associated methods to facilitate automatic categorization of events, described in detail above in connection with FIGS. 4 and 5, are used in a behavioral targeting system, which is configured to identify interests of users based on the users' online activities.

Figure 6:
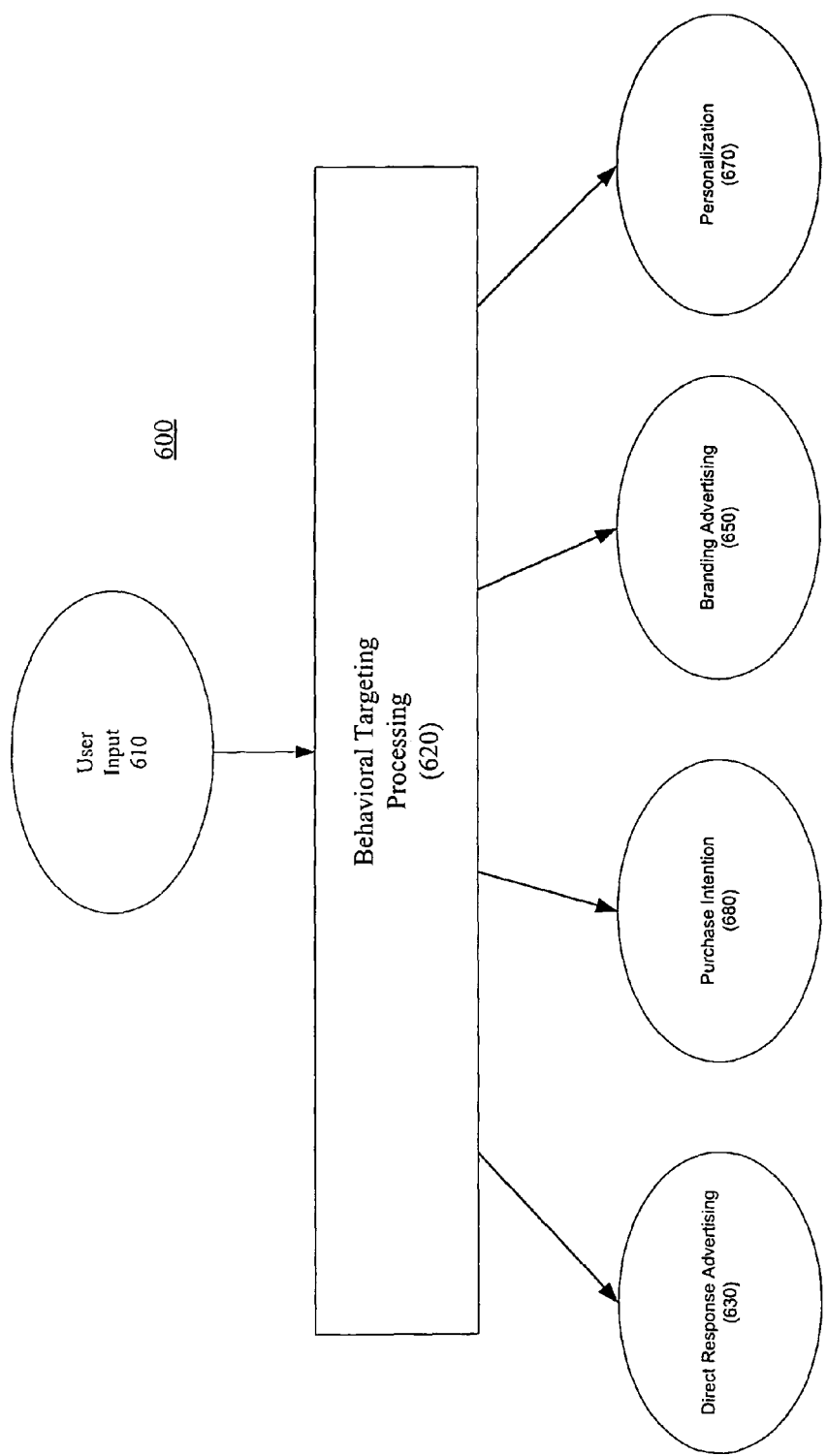
FIG. 6 is a block diagram illustrating a generalized behavioral targeting system.

FIG. 6 is a block diagram illustrating a generalized behavioral targeting system. The behavioral targeting system 600 includes a behavioral targeting processing module 620, which captures the user input 610, such as, for example, one or more events. The behavioral targeting processing module 620 generates a plurality of user interest profiles specific for a target objective. A user interest profile further provides an indication of interest in a subject matter for a particular objective. For example, the user profile output may indicate that the user is a good candidate for a particular objective regarding a "finance" topic, and a poor candidate for the specific objective regarding a "music" topic.

In one embodiment, the behavioral targeting processing module 620 generates user interest profiles for marketing objectives. As shown in FIG. 6, the behavioral targeting system 600 outputs user interest profiles for direct response advertising (630), brand awareness advertising (650), personalization activities (670), and purchase intention activities (680).

Figure 7:
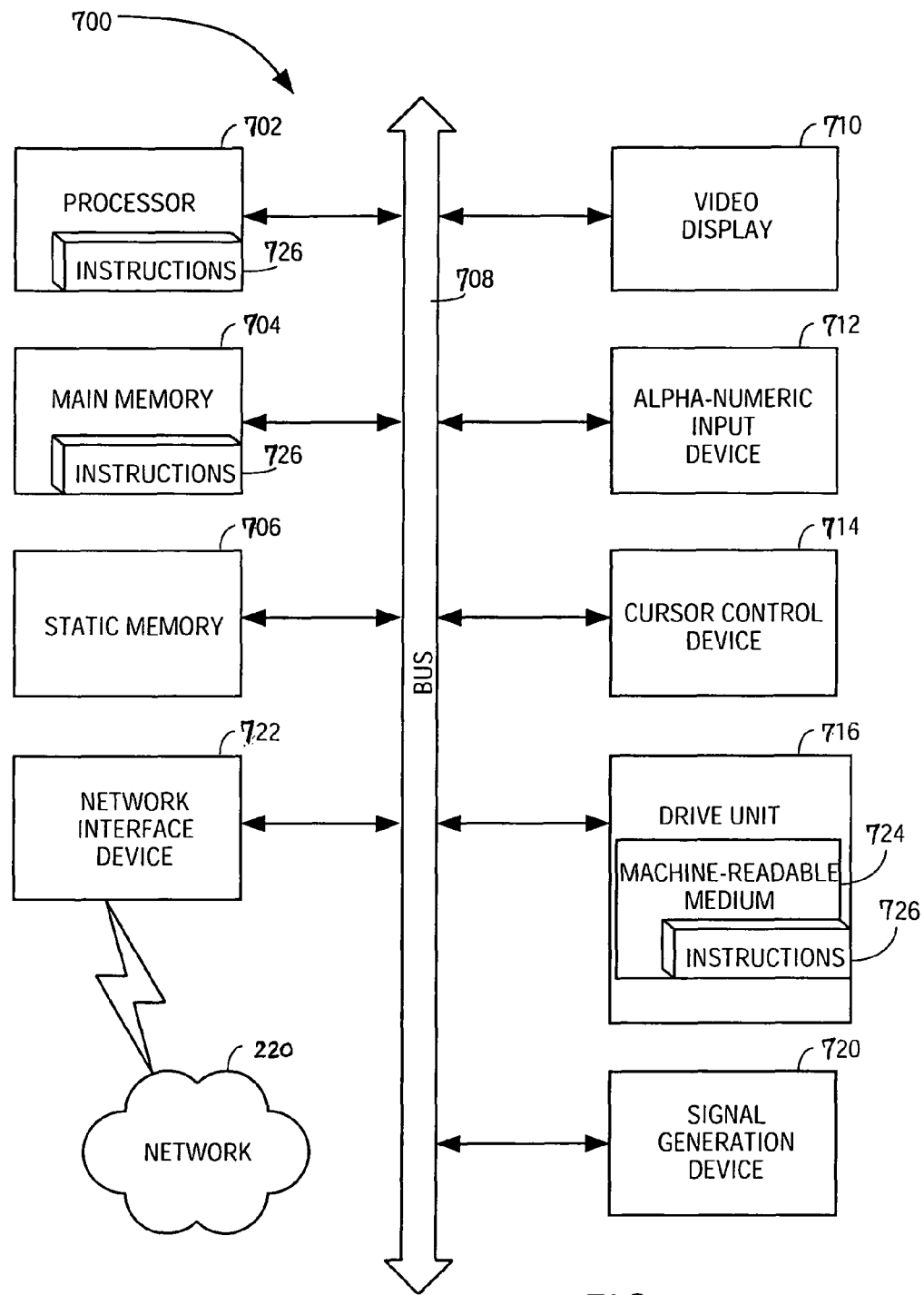
FIG. 7 is a diagrammatic representation of a machine in the exemplary form of a computer system within which a set of instructions may be executed.

FIG. 7 shows a diagrammatic representation of a machine in the exemplary form of a computer system 700 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 700 includes a processor 702, a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker), and a network interface device 720.

The disk drive unit 716 includes a machine-readable medium 724 on which is stored a set of instructions (i.e., software) 726 embodying any one, or all, of the methodologies described above. The software 726 is also shown to reside, completely or at least partially, within the main memory 704 and/or within the processor 702. The software 726 may further be transmitted or received via the network interface device 720.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing information in a form readable by a machine (e.g., a computer). For example, a machine readable medium includes read-only memory (ROM); random access memory (RAM); magnetic disk storage media; optical storage media; flash memory devices; electrical, optical or acoustical, or any other type of media suitable for storing information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A computer-implemented method for automated classification of events, said method comprising:
   receiving, at said entity, at least one event, wherein said event comprises on-line activity between said user and said entity;
   determining a plurality of event units from said event;
   retrieving a plurality of keywords from a keyword database, each retrieved keyword matching a corresponding event unit;
   identifying a category associated with each of said keywords retrieved;
   storing a set of statistical parameters, based on past analysis of events, for each keyword and said category associated with each of said keywords retrieved, wherein said statistical parameters comprise ambiguity parameter values of said keywords and statistical probabilities that said keywords and said categories dominate one or more other of said keywords and said categories;
   selecting a dominant keyword from said keywords retrieved based on said statistical parameters by:
      using said at least one keyword category and an ambiguity parameter value calculated for said each keyword as a factor of a conditional probability that said at least one keyword category is associated with said dominant keyword; and
   categorizing said event based on said category associated with said dominant keyword, wherein said category identifies primary subject matter for said event.

2. The method according to claim 1, further comprising storing said categorized event within said keyword database.

3. The method according to claim 1, further comprising parsing said event to obtain at least one event unit.

4. The method according to claim 1, wherein said selecting further comprises:
   retrieving predetermined event processing rules from a rules database; and
   applying said predetermined processing rules to rank said each retrieved keyword in conjunction with said calculated ambiguity parameter value.

5. The method according to claim 1, wherein said selecting further comprises:
   selecting said dominant keyword based on a highest-ranked output value calculated for said each retrieved keyword; and
   retrieving said at least one category associated with said dominant keyword from said keyword database.

6. The method according to claim 5, wherein said selecting further comprises:
   retrieving said set of statistical parameters corresponding to said each retrieved keyword;
   assembling a vector containing said set of statistical parameters for said each retrieved keyword; and
   calculating said output value for said each retrieved keyword based on said vector, said output value indicating a probability that a corresponding retrieved keyword is selected as said dominant keyword.

7. The method according to claim 1, wherein said selecting further comprises:
   selecting a keyword of a pair of retrieved keywords, said selection based on an output value calculated for said each keyword of said pair of keywords, said selected keyword having a highest-ranked output value;
   repeating said selecting for at least one subsequent pair of retrieved keywords including said selected keyword to obtain said dominant keyword; and
   retrieving said at least one category associated with said dominant keyword from said keyword database.

8. The method according to claim 7, wherein said output value indicates a probability that said selected keyword is said dominant keyword.

9. The method according to claim 1, wherein said each keyword is associated with at least one keyword category, and wherein said each keyword and said at least one keyword category are stored hierarchically within said keyword database.

10. A system for automated classification of events, said system comprising:
  at least one database for storing a plurality of keywords and categories associated with said keywords and for storing a set of statistical parameters, based on past analysis of events, for keywords and said categories associated with said keywords, wherein said statistical parameters comprise ambiguity parameter values of said keywords and statistical probabilities that said keywords and said categories dominate one or more other of said keywords and said categories; and
  an event categorization platform, comprising processor and memory, to receive at least one event, wherein said event comprises on-line activity between said user and said entity and to determine a plurality of event units from said event, said event categorization platform comprising:
  a token analysis module coupled to said database, said token analysis module to retrieve a plurality of keywords from said database, each retrieved keyword matching a corresponding event unit, to identify a category associated with each of said keywords retrieved, to select a dominant keyword from said keywords retrieved based on said statistical parameters by using said at least one keyword category and an ambiguity parameter value calculated for said each keyword as a factor of a conditional probability that said at least one keyword category is associated with said dominant keyword and to categorize said event based on a category associated with said dominant keyword, wherein said category for said event identifies primary subject matter for said event, wherein said token analysis module is further configured to selecting said dominant keyword based on said at least one keyword category and an ambiguity parameter value; and
  an ambiguity processing module coupled to said token analysis module, said ambiguity processing module to calculate said ambiguity parameter value for said each keyword as a factor of a conditional probability that said at least one keyword category is associated with said dominant keyword.

11. The system according to claim 10, wherein said token analysis module further stores said categorized event within said keyword database.

12. The system according to claim 10, further comprising a parser module coupled to said token analysis module, said parser module to parse said event to obtain at least one event unit.

13. The system according to claim 10, wherein said token analysis module further retrieves predetermined event processing rules from a rules database, and applies said predetermined processing rules to rank said each retrieved keyword in conjunction with said calculated ambiguity parameter value.

14. The system according to claim 10, wherein said token analysis module further selects said dominant keyword based on a highest-ranked output value calculated for said each retrieved keyword and retrieves said at least one category associated with said dominant keyword from said keyword database.

15. The system according to claim 14, further comprising:
  a machine-learning unit coupled to said token analysis module;
  said token analysis module to retrieve said set of statistical parameters corresponding to said each retrieved keyword and to assemble a vector containing said set of statistical parameters for said each retrieved keyword;
  said machine-learning unit to calculate said output value for said each retrieved keyword based on said vector, said output value indicating a probability that a corresponding retrieved keyword is selected as said dominant keyword.

16. The system according to claim 10, wherein said token analysis module further selects a keyword of a pair of retrieved keywords, said selection based on an output value calculated for said each keyword of said pair of keywords, said selected keyword having a highest-ranked output value, repeats said selecting for at least one subsequent pair of retrieved keywords including said selected keyword to obtain said dominant keyword, and retrieves said at least one category associated with said dominant keyword from said keyword database.

17. The system according to claim 16, wherein said output value indicates a probability that said selected keyword is said dominant keyword.

18. The system according to claim 10, wherein said each keyword is associated with at least one keyword category, and wherein said each keyword and said at least one keyword category are stored hierarchically within said keyword database.

19. A computer readable storage medium for storing executable instructions, which, when executed in a processing system, cause said processing system to perform a method for automated classification of events comprising:
  receiving, at said entity, at least one event, wherein said event comprises on-line activity between said user and said entity;
  determining a plurality of event units from said event;
  retrieving a plurality of keywords from a keyword database, each retrieved keyword matching a corresponding event unit;
  identifying a category associated with each of said keywords retrieved;
  storing a set of statistical parameters, based on past analysis of events, for each keyword and said category associated with each of said keywords retrieved, wherein said statistical parameters comprise ambiguity parameter values of said keywords and statistical probabilities that said keywords and said categories dominate one or more other of said keywords and said categories;
  selecting a dominant keyword from said keywords retrieved based on said statistical parameters by:
  using said at least one keyword category and an ambiguity parameter value calculated for said each keyword as a factor of a conditional probability that said at least one keyword category is associated with said dominant keyword; and
  categorizing said event based on said category associated with said dominant keyword, wherein said category identifies primary subject matter for said event.

20. The computer readable medium according to claim 19, wherein said selecting further comprises:
  selecting said dominant keyword based on a highest-ranked output value calculated for said each retrieved keyword; and
  retrieving said at least one category associated with said dominant keyword from said keyword database.

21. The computer readable medium according to claim 20, wherein said selecting further comprises:
  retrieving said set of statistical parameters corresponding to said each retrieved keyword;
  assembling a vector containing said set of statistical parameters for said each retrieved keyword; and calculating said output value for said each retrieved keyword based on said vector, said output value indicating a probability that a corresponding retrieved keyword is selected as said dominant keyword.

22. The computer readable medium according to claim 19, wherein said selecting further comprises:

selecting a keyword of a pair of retrieved keywords, said selection based on an output value calculated for said each keyword of said pair of keywords, said selected keyword having a highest-ranked output value;

repeating said selecting for at least one subsequent pair of retrieved keywords including said selected keyword to obtain said dominant keyword; and retrieving said at least one category associated with said dominant keyword from said keyword database.

* * * * *